United States Patent [19]

Okabe et al.

[11] Patent Number: 5,436,037
[45] Date of Patent: Jul. 25, 1995

[54] LIQUID CRYSTAL ORIENTATION CONTROLLING MEMBRANES AND LIQUID CRYSTAL ELEMENTS USING THE SAME

[75] Inventors: Nobuhiro Okabe; Yuvraj S. Negi; Ichiro Kawamura; Tohru Ohode, all of Tokyo; Norio Yamamoto; Yuichiro Yamada, both of Aichi, all of Japan

[73] Assignee: Showa Shell Sekiyu Kabushiki Kaisha, Tokyo, Japan

[21] Appl. No.: 945,617

[22] Filed: Sep. 16, 1992

[30] Foreign Application Priority Data

Sep. 26, 1991 [JP] Japan .................................. 3-274743

[51] Int. Cl.$^6$ .............................................. G02F 1/1337
[52] U.S. Cl. ................................... 428/1; 359/75; 359/78
[58] Field of Search .................. 428/1; 359/75, 78; 528/353, 226, 229, 350, 172, 173, 176, 188, 220

[56] References Cited

U.S. PATENT DOCUMENTS

| | | | |
|---|---|---|---|
| 3,649,601 | 3/1972 | Critchley et al. | 528/353 |
| 3,766,117 | 10/1973 | McQuade | 528/353 |
| 4,367,924 | 1/1983 | Clark et al. | 350/334 |
| 5,046,822 | 9/1991 | Matsuda et al. | 428/473.5 |
| 5,046,823 | 9/1991 | Mori et al. | 428/1 |
| 5,214,523 | 5/1993 | Nito et al. | 359/76 |

FOREIGN PATENT DOCUMENTS

| | | |
|---|---|---|
| 0249881 | 6/1987 | European Pat. Off. |
| 0259761 | 9/1987 | European Pat. Off. |
| 0441013 | 2/1990 | European Pat. Off. |
| 0437732 | 11/1990 | European Pat. Off. |

OTHER PUBLICATIONS

Yamamoto et al, Switching Properties in Antiferroelectric Liquid Crystals, Japanese Journal of Applied Physics 30:2380 Sep. 1991.

*Primary Examiner*—Alexander S. Thomas
*Attorney, Agent, or Firm*—Cushman Darby & Cushman

[57] ABSTRACT

A liquid crystal orientation controlling membrane, characterized by the polyimide membrane comprising the repeating unit represented by the formula:

$$-Ar_1-N\underset{\underset{O}{\parallel}}{\overset{\overset{O}{\parallel}}{\underset{C}{\overset{C}{\diagdown}}}}Ar_2\underset{\underset{O}{\parallel}}{\overset{\overset{O}{\parallel}}{\underset{C}{\overset{C}{\diagup}}}}N- \qquad (I)$$

wherein $Ar_1$ represents a diamine moiety which is selected from the group consisting of

[chemical structure: diphenyl sulfide] and

[chemical structure: bisphenol-A based diether with two CH$_3$ groups], and $Ar_2$ represents tetravalent carboxylic acid moiety which is selected from the group consisting of

[chemical structures: benzene tetrayl; benzophenone tetrayl]

and

[chemical structure: biphenyl tetrayl]

Another invention is a ferroelectric liquid crystal element or an antiferroelectric liquid crystal element using the polyimide orientation controlling membrane mentioned above. The present liquid crystal element is used to a large picture display with high resolution, a TV picture display with wide viewing angle and a liquid crystal optical shutter.

3 Claims, 8 Drawing Sheets

FERROELECTRIC LIQUID CRYSTAL HAVING BISTABLE STATES

ANTIFERROELECTRIC LIQUID CRYSTAL HAVING TRISTABLE STATES

LIQUID CRYSTAL ORIENTATION CONTROLLING MEMBRANES AND LIQUID CRYSTAL ELEMENTS USING THE SAME

FIELD OF THE INVENTION

The present invention relates to a liquid crystal orientation controlling membrane for controlling the initial orientation state of livid crystal molecules. The present invention also relates to a ferroelectric livid crystal element or an antiferroelectric liquid crystal element using the same.

PRIOR ART

Twisted nematic (herein referred to as TN) liquid crystal elements have been widely used as the conventional liquid crystal elements (M. Schadt and W. Herfrich, Applied Physics Letters, vol. 18, No. 4, pages 127–128). The TN type liquid crystal element comprises a nematic liquid crystal encapsulated between a pair of transparent electrode substrates and the liquid crystal molecules twist 90° between the substrates. The element loses its twist structure on the application of electric field and passes or intercepts light to display light and darkness.

However, the TN type liquid crystal element, when intended to be applied to a liquid crystal display device having a matrix electrode structure in which a scanning electrode group and a signal electrode group both in the form of column stripe patters are arranged orthogonally, is applied only to strictly defined fields, because it has a problem that the picture element density of the matrix cannot be increased due to the slow response speed or insufficient nonlinearity of the voltage-light transmittance property.

In such situations, a ferroelectric liquid crystal attracts a good deal of attention (Le Journal de Physique, vol. 36, March 1975, L-69-L-71).

Ferroelectric liquid crystal elements having bistability have been investigated (see, for example, Japanese Patent Publication No. 22287/1988, U.S. Pat. No. 4,367,924). As the bistable liquid crystal, optically active liquid crystals having a chiral smectic C phase (Sm C*) or a smectic H phase (Sm H*) are known, and these liquid crystals form an intrinsic helical structure in the bulk state. When the liquid crystal is sandwitched between the substrates which are spaced at a short distance in μm 10 range enough to control the herical structure, it exhibits two optically stable states in response to electric fields. In other words, the liquid crystal is oriented to the first optically stable state in response to the electric field in one direction and to the second optically stable state in response to the electric field in the opposite direction. Thus, the aforementioned optically stable states of the liquid crystal can be switched by the directions of the electric field applied. Moreover, the ferroelectric liquid crystal has an advantage that the switching occurs rapidly as compared to the TN type liquid crystal and the optically stable states are maintained even if the electric field has been removed. FIG. 1-(b) illustrates the variation of optical transmittance on applying the triangular wave electric voltage shown in FIG. 1-(a) to the display device using the liquid crystal.

On the other hand, an antiferroelectric liquid crystal having three optically stable states has been recently proposed and attracts a good deal of attention (A. D. L. Chandani, E. Gorecka, Y. Ouchi, H. Takezoe and A. Fukuda, Jpn. J. Appl. Phys., 28(1989), L1265).

The liquid crystal is oriented to the first optically stable state at no electric field, to the second optically stable state in response to the electric field in one direction and to the third optically stable state in response to the electric field in the opposite direction and thus can be switched at a high speed between the aforementioned three stable states depending on the directions and intensities of the electric field applied. The liquid crystal shows the hysteresis in which the variation of the optical transmittance between the aforementioned three stable states to the voltage applied is shifted on the voltage axis (for example, the voltage at which the first stable state is changed into the second 10 stable state by increasing the applied electric field is different from the voltage at which the second stable state is changed into the first stable state by decreasing the applied electric field), so that it is anticipated to realize a liquid crystal display device of the simple matrix type having a high resolution and a high contrast display. FIG. 1-(c) illustrates the variation of optical transmittance on applying the triangular wave electric field shown in FIG. 1-(a) to the display device using the antiferroelectric liquid crystal.

The liquid crystal elements using antiferroelectric liquid crystal compounds have to show uniform molecular arrangement at no electric field and besides show the aforementioned three optically stable states effectively, in order to have them displayed the desired driving performances.

For example, it is necessary that variation of optical transmittance has enough non-linearity and hysteresis when a region in which the projection of the longer axis of a liquid crystal on surface of substrate is arranged in one direction and vertical to the surface of a smectic layer is formed at no electric field.

However, in the conventional liquid crystal element, such an orientation state over a wide range can hardly be obtained and is an inherent problem to the practical use of it. As the treatment for orienting the liquid crystal element, some treatments such as a method of applying magnetic field to the substrates, a method of applying shearing force to them or a method of providing an orientation controlling membrane comprising a polymer membrane and rubbing the surface of an orientation controlling membrane to one direction are known. These methods do not always give a satisfactory orientation state, and thus an effective method of orientation treatment is desired to exhibit satisfactorily the aforementioned properties.

The present inventors have conducted earnest researches about these problems. As a result, they have found that a polymer membrane having a certain structure can be effectively used as an orientation controlling membrane.

That is, the object of the present invention is to provide a liquid crystal orientation controlling membranes which can exhibit its excellent properties by improving the initial orientation state of a ferroelectric liquid crystal element and an antiferroelectric liquid crystal element and realizing at uniform molecular arrangement over a wide area. Thus the liquid crystal elements can be effectively used as a display device having a high speed response, a high picture element density and a large area and as a high speed optical shutter.

The present invention relates to a liquid crystal orientation controlling membrane, characterized by the polyimide membrane comprising the repeating unit represented by the formula (I);

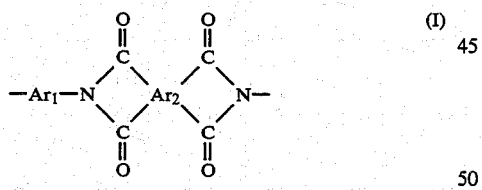

wherein Ar$_1$ represents a diamine moiety which is selected from the group consisting of

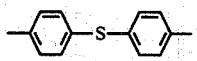

and

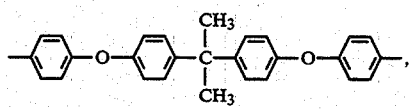

Ar$_2$ represents a tetravalent carboxylic acid moiety which is selected from the group consisting of

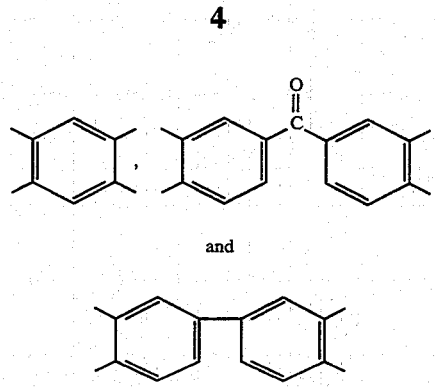

The present invention also relates to a ferroelectric liquid crystal element or antiferroelectric liquid crystal element comprising encapsulating a ferroelectric liquid crystal having optically bistable states or an antiferroelectric liquid crystal having optically tristable states, respectively, between a pair of transparent electrode substrates, characterized in that orientation controlling membranes are formed on the surfaces of said pair of substrates contacting with the liquid crystal and said orientation controlling membranes are constituted from the polyimide membrane represented by the formula (I);

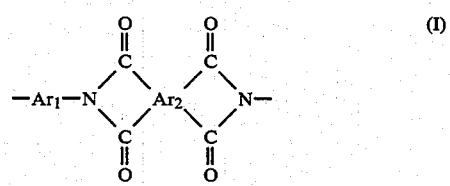

wherein Ar$_1$ represents diamine moiety which is selected from the group consisting of

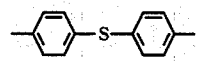

and

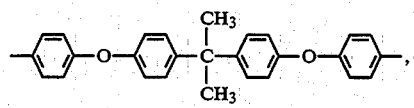

and Ar$_2$ represents a tetravalent carboxylic acid moiety which is selected from the group consisting of

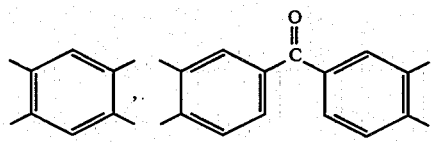

The polyimide of the present invention can be synthesized by the following reaction:

for 1 hour, at 200° C. for 1 hour and at 300° C. for 1 hour to give the polyimide.

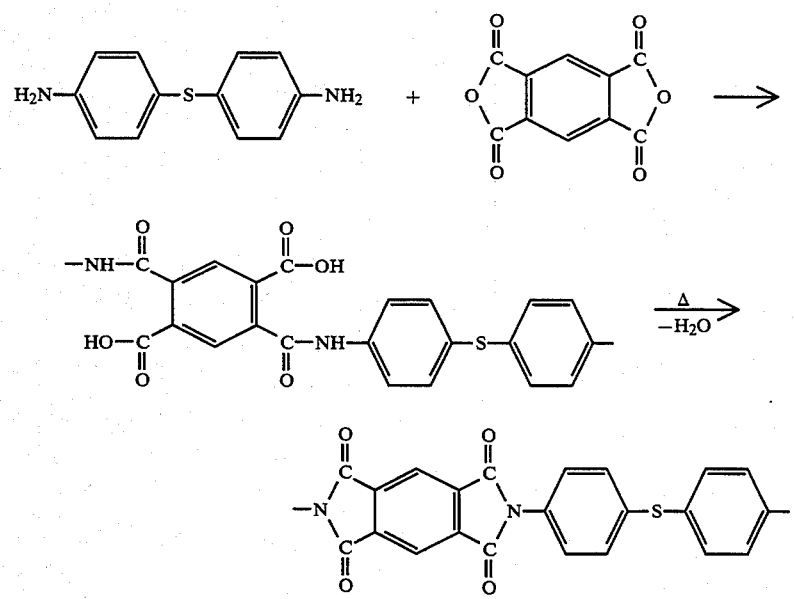

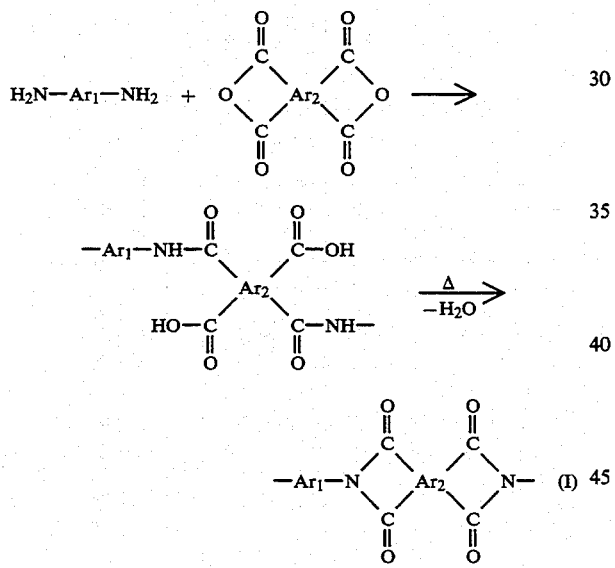

The method for synthesizing the compound of the present invention is further described in detail with reference to an example.

After dissolving bis(4-aminophenyl)sulfide in N,N-dimethylacetamide (DMAC), pyromellitic dianhydride is added to the solution in nitrogen gas with stirring at a temperature of 10°–15° C. to give polyamide-carboxylic acid. A glass substrate is coated with the polyamide carboxylic acid to form a film, which is cured at 100° C.

The present invention is further described in detail with reference to examples, but the present invention should not be construed to be limited thereto.

EXAMPLE 1

Figure 1A:
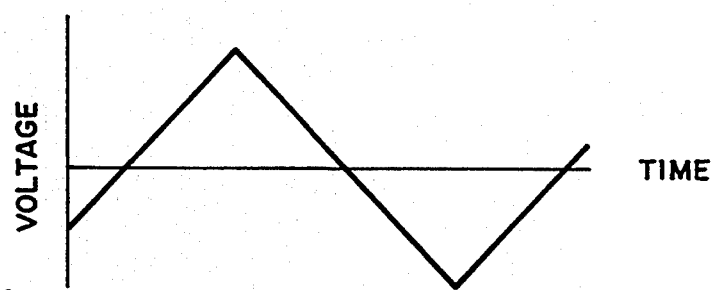
FIG. 1(a) illustrates a triangular wave voltage applied.
Figure 1B:
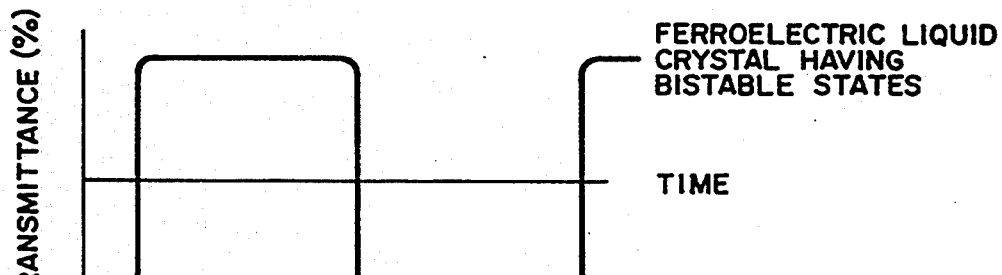
FIG. 1(b) illustrates an optical response properties of a liquid crystal which shows bistable states.
Figure 1C:
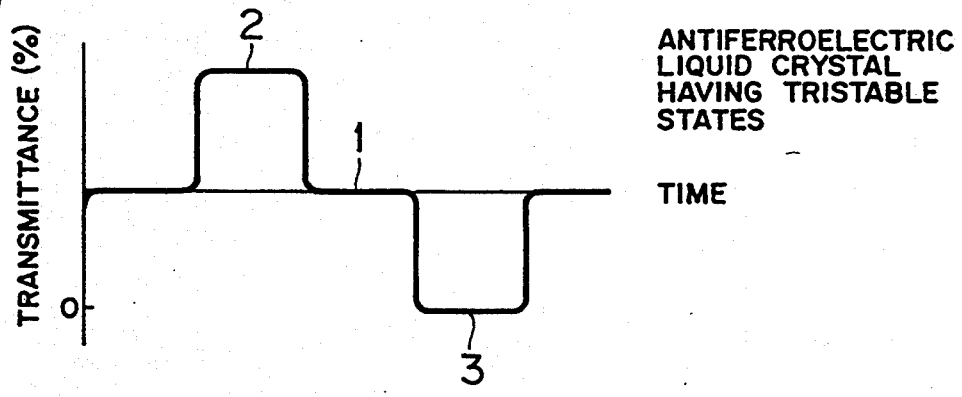
FIG. 1(c) illustrates an optical response properties (1, 2 and 3) of a liquid crystal which shows optically tristable states.
Figure 2:
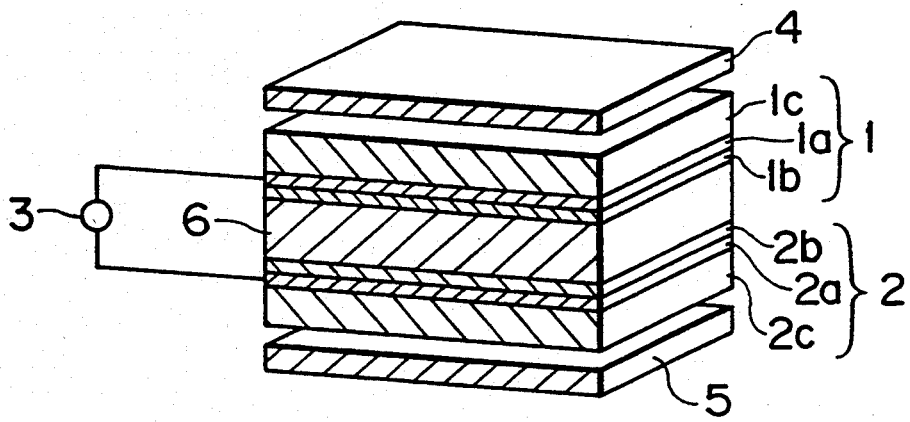
FIG. 2 shows the whole constitution diagram of a liquid crystal element used in Example 1-2 and Comparative Example 1-2, wherein 1 and 2 represent transparent electrodes, 3 represents an external electric source, 4 and 5 represent. polarizing plates, 6 represents a liquid crystal, 1a and 2a represent transparent electrodes, 1b and 2b represent orientation controlling membranes, and 1c and 2c represent glass substrates.

FIG. 2 shows the whole constitution diagram of a liquid crystal element to which the present invention is applied. The liquid crystal element, for example, has a pair of electrode substrates 1 and 2 which are spaced in parallel with the distance of 2.2 μm and has an antiferroelectric liquid crystal mixture sealed in between the pair of electrode substrates.

The electrode substrates 1, 2 comprise transparent substrates made of glass or resin 1c, 2c. Inner surfaces of the transparent substrates are covered with transparent electrodes 1a and 2a having transparent electroconductive membranes of indium oxide or tin oxide (ITO). The surfaces of transparent electrodes 1a, 2a which contact with liquid crystal 6 are further covered with orientation control membranes 1b, 2b made of polyimide membrane (PI-201) having the formula PI-201 described below.

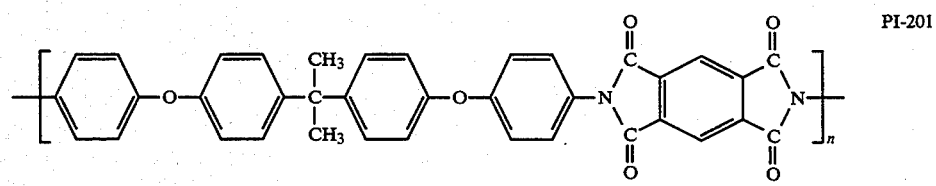

As the antiferroelectric liquid crystal 6, it is preferred to use antiferroelectric liquid crystal compounds which exhibit optically tristable states depending on directions and voltages of the applied electric field such as the mixture of the liquid crystal compound represented by the formulae (1)–(3).

(R),(S)-(−)-4-(1-methylheptyloxycarbonyl)phenyl 4-octyloxybiphenyl-4-carboxylate (MHPOBC)

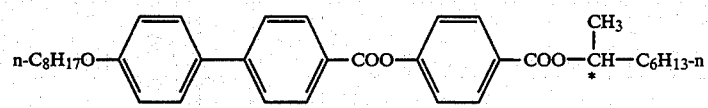

(1)

(R),(+)-4-(1-trifluoromethylheptyloxycarbonyl)phenyl 4-octyloxybiphenyl-4-carboxylate (TFMHPOBC)

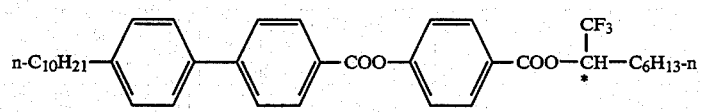

(2)

(R),(+)-4-(1-trifluoromethylheptyloxycarbonyl)phenyl 4-decylbiphenyl-4-carboxylate (TFPDCBC)

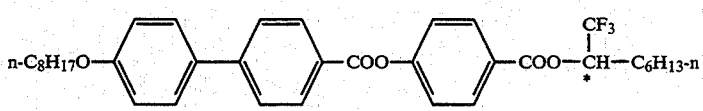

(3)

The aforementioned three liquid crystal materials were mixed in a ratio of (1):(2):(3)=15.5:69.0:15.5 by weight and the phase series of the mixture were measured with a differential scanning calorimeter (DSC) and also observed with a polarization microscope to obtain the following results;

$$Cry \xrightarrow{-25°\ C.} SmC^*A \xrightarrow{65°\ C.} SmC^* \xrightarrow{85°\ C.} SmA \xrightarrow{90°\ C.} Iso$$

wherein
  Cry: crystalline phase;
  SmC*A: chiral smectic C*A phase (optically tristable states are exhibited in this phase: also mentioned as S*(3));
  SmC*: chiral smectic C* phase;
  SmA: smectic A phase;
  Iso: isotropic liquid phase.

The aforementioned three liquid crystal compounds may be used alone, and any other antiferroelectric liquid crystals having optically tristable states or ferroelectric liquid crystal having bistable states may be used as well.

Following liquid crystal element as shown FIG. 2 was assembled. The transparent electrodes 1a, 2a were connected to the external electric source 3 so that electric field could be applied to the liquid crystal 6, and polarizing plates 4, 5 were provided on the upper surface of the electrode substrate 1 and on the lower surface of the electrode substrate 2, respectively.

The polyimides represented by the formulae shown later were synthesized and the orientation controlling membranes 1b, 2b were formed on the substrate by the following method.

To 20 ml of dry dimethylacetamide was added 2,2-bis[4-(4-aminophenoxy)phenyl]propane (3 mmol) and dissolved under nitrogen atmosphere at a temperature of 10°–15° C. Pyromellitic dianhydride (3 mmole) was added to the solution with stirring under nitrogen atmosphere at a temperature of 10°–15° C. Stirring was continued for about 1.5 hours and further continued at room temperature for about 1.5 hours. The viscous solution was then left standing overnight at room temperature.

The viscosity of the dimethylacetamide solution of the polyamide-carboxylic acid was measured at a concentration of 0.5 g/dl using a Ostwald's viscometer. The polyamide-carboxylic acid had a viscosity of 1.76 dl/g.

Figure 3:
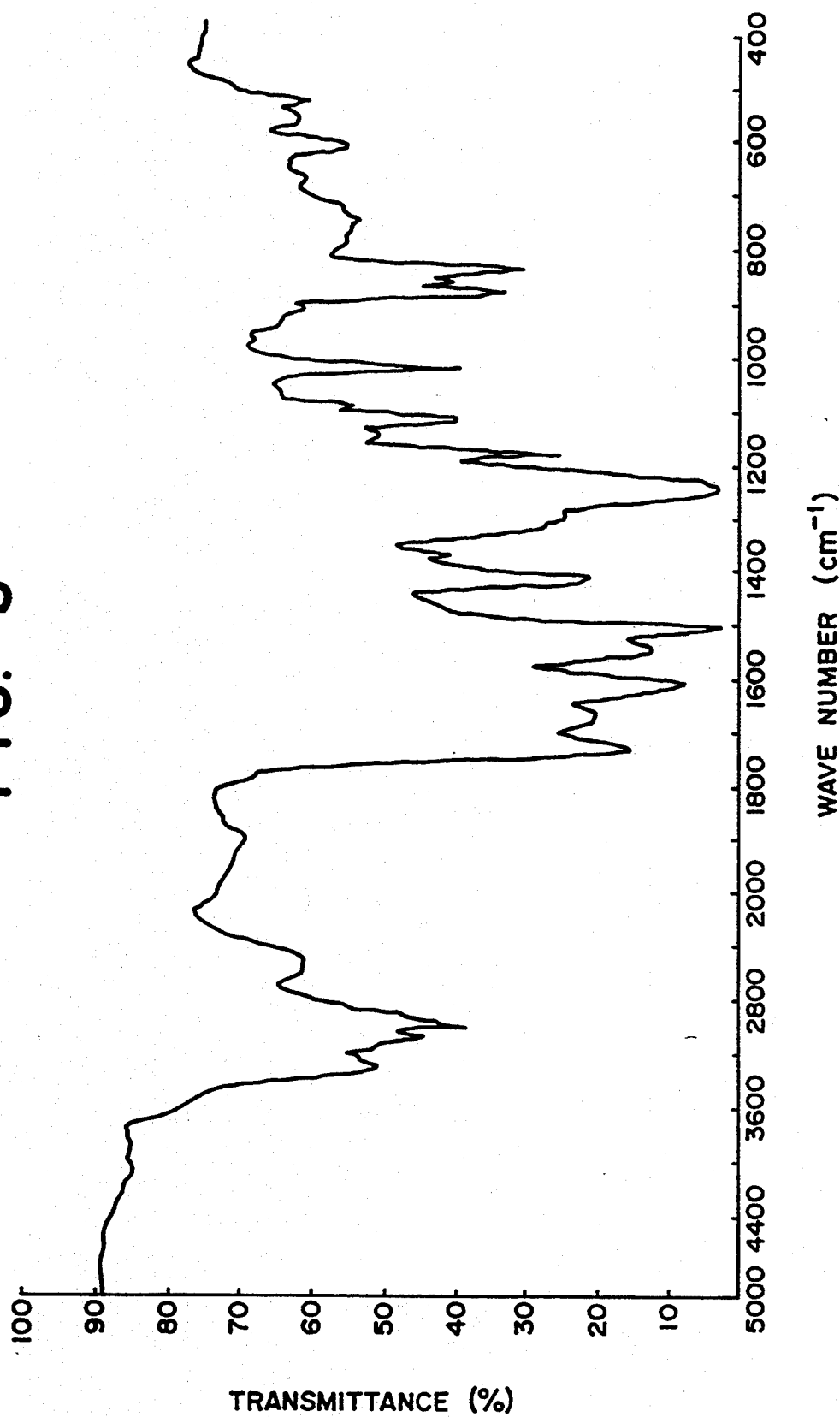
FIG. 3 shows the infrared absorption spectrum of the polyamide-carboxylic acid of the present invention in Example 1 (PI-201). In the spectra of FIGS. 3 and 7-9, the ordinate means transmittance and the abscissa means wave number.

FIG. 3 shows the infrared spectrum of the polyamide-carboxylic acid. A solution of the polyamide-carboxylic acid in dimethylacetamide was spread on a glass plate and heated in air oven at 100° C. to remove the solvent. The film thus formed was peeled from the glass plate and subjected to the measurement of the infrared spectrum.

(a) A solution of the aforementioned polyamide-carboxylic acid according to the present invention in dimethylacetamide and (b) polyamide-carboxylic acid obtained from 2,2-bis[4(4-aminophenoxy)phenyl]di(trifluoromethyl)propane and pyromellitic dianhydride as a comparative example were spread on the transparent electrodes 1a, 2a formed on the transparent substrates 1c, 2c, respectively, at a thickness of 400–1,000 Å by spin-coat method and cured at 100° C. for 1 hour, at 200° C. for 1 hour and at 300° C. for 1 hour. Each surface of these membranes was subjected to rubbing treatment in one direction with an unwoven fabric such as nylon or polyester to give the aforementioned orientation controlling membranes 1b, 2b.

The polyimide orientation membrane of this example is represented by the formula:

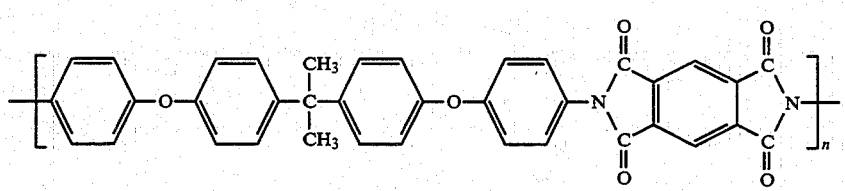

PI-201

The electrode substrates 1, 2 having the orientation controlling membranes 1b, 2b, respectively, formed thereon as described above were then assembled so that the orientation controlling membranes 1b, 2b were faced inside and parallel to each other and the direction of the aforementioned rubbing treatment were the same or opposite. The aforementioned antiferroelectric liquid crystal 6 was injected between the electrode substrate 1 and 2. The injection of the antiferroelectric liquid crystal 6 was conducted by injecting the liquid crystal heated into an isotropic liquid (Iso) using of capillary phenomenon. The liquid thus injected was gradually cooled down at a rate of 1°–2° C./min until it reached the temperature range of the SmC*A phase.

Figure 4:
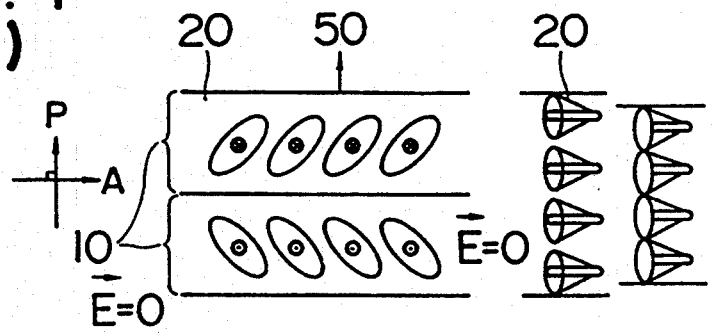
FIG. 4 shows diagrams illustrating the orientation state of a liquid crystal, wherein (a) illustrates the orientation at zero voltage, (b) illustrates the orientation at a positive voltage and (c) illustrates the orientation at a negative voltage.
Figure 4:
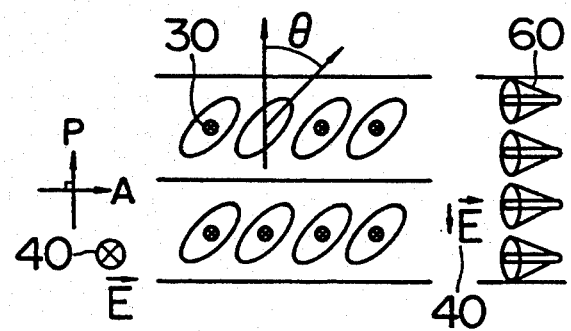
Figure 4:
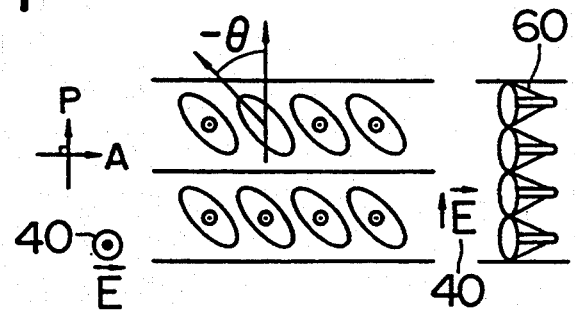

Thus, the liquid crystal molecules were arranged in such an orientation as shown in FIG. 4(a) at no electric field.

The drawing in the left of FIG. 4(a) is a diagrammatic view taken from the front of the element, in which the layer 10 is orthogonal to the rubbing direction 50, and the spontaneous polarization 30 of the liquid crystal molecules 20 is aligned in opposite between the adjacent two layers and the projection of the longer axis of the molecule on the electrode substrate is on the average parallel to the rubbing direction 50. The drawing in the right of FIG. 4(a) shows the sectional view of the element.

Orientation contrast was measured in order to evaluate quantitatively the degree of the arrangement. The orientation contrast of the polyimide membrane of the present invention was in the range of 145–177. The term orientation contrast means a quotient where the maximum transmittance was divided by the minimum of the optical transmittance of the element having the polyimide membrane measured with a photomultiplier when the element is rotated under the cross-Nicol's prism of a polarizing microscope. The larger the orientation contrast value is, the better the orientation state is.

It is apparent from the value of the orientation contrast that the element of the present invention has high contrast as compared with that of the element in Comparative Example 1 and exhibits a good orientation state as well.

Next, as shown in FIG. 2, the polarizing plates 4, 5 are provided on the outer surfaces of the electrode substrates 1, 2 to ensure that the polarization axis P of the polarization plate 5 is parallel to the rubbing direction 50 and the polarization axis A of the polarization plate 4 is orthogonal to the rubbing direction 50 [FIG. 4(a)], and triangular wave voltage (1 Hz) is applied to the element by the external electric source 3 to measure the voltage-transmittance properties.

The liquid crystal molecules take the orientation shown in FIG. 4(a) at zero voltage, so that linear polarized light passed through the polarization plate 5 could not pass through the polarization plate 4 and the "dark" state was exhibited.

When the voltage was increased in the positive range, the direction of spontaneous polarization 30 of the liquid crystal molecules was arrayed to the direction of electric field 40 (referring to FIG. 4(b), the direction of the electric field 40 is directed from the front to the rear of the paper surface in the front elevation of the element on the left side, and is directed downward in the sectional view of the element on the right side), and the liquid crystal molecules rotate along the smectic cone 60 and take an arrangement which is shifted from the rubbing direction 50 by the angle $\theta$. The linear polarized light having passed through the polarization plate 5 rotates its plane of polarization by the double refraction property of the liquid crystal then passes through the polarization plate 4 bringing the resulting "light" state. If voltage is decreased to a negative range, the liquid crystal molecules takes the arrangement shown in FIG. 4(c) according to the electric field in the opposite direction to that in the aforementioned FIG. 4(b). In this case, the liquid crystal cell shows the "light" state.

Figure 5:
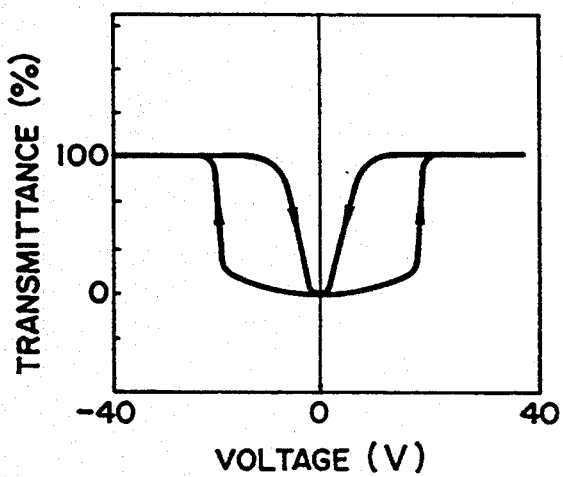
FIG. 5 shows the relationship of an applied voltage and transmittance in the liquid crystal element using PI-201 as an orientation membrane in Example 1.

FIG. 5 shows the phenomenon mentioned above in a graph having voltage as the abscissa and transparency as the ordinate with reference to the polyimide PI-201 in Example 1.

As apparent from the comparison with the commercially available polyimide orientation membrane in Comparative Example 2, the liquid crystal element using the polyimide orientation membrane of the present invention more rapidly changes from the "dark" state to the "light" state when increasing voltage from zero volt exceeds a certain voltage (non-linearity). When the voltage is decreased, the liquid crystal element changes from the "light" state to the "dark" state at certain voltage. The difference of the both voltages is larger than the one in the liquid crystal element using commercially available polyimide orientation membrane. It is clear that the non-linearity and the hysteresis are improved.

The driving margin calculated from the following equation was 0.23.

$$\text{Driving margin } (M): \frac{Vth(10) - Vth(90)}{Vsat(90) - Vth(10)}$$

wherein
Vth(10): voltage at which the transmittance is 10% on increasing the positive or negative voltage;
Vsat(90): voltage at which the transmittance is 90% on increasing the positive or negative voltage;
Vth(90): voltage at which the transmittance is 90% on decreasing the positive or negative voltage.

COMPARATIVE EXAMPLE 1

A liquid crystal element was prepared in the same manner as in Example 1 except that the polyimide PI-201 was replaced by the polyimide represented by the formula:

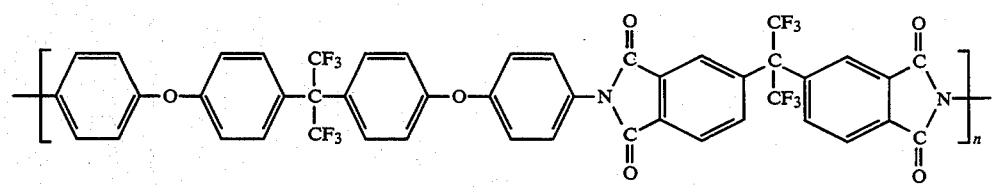

The liquid crystal element was gradually cooled down at a rate of 1°–2° C./min until it reached the temperature range of the SmC*A phase, and the orientation contrast was measured. It was found that the liquid crystal element had a orientation contrast of 11 which is lower as compared to that of the liquid crystal element in Example 1 and thus the orientation state was not so good.

COMPARATIVE EXAMPLE 2

A liquid crystal element was prepared in the same manner as in Example 1 except that the commercially available polyimide orientation membrane LX5400 (manufactured by Hitachi Chemical Co., Ltd., the chemical formula has not been reported) was used in place of the polyimide PI-201 used as the orientation membrane in Example 1.

Figure 6:
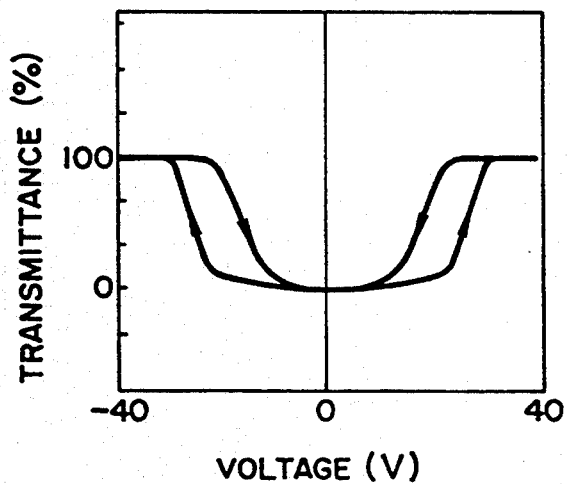
FIG. 6 shows the relationship of an applied voltage and transmittance in the liquid crystal element using the polyimide membrane in Comparative Example 2.

Furthermore, in the same manner as in Example 1, the polarization plates are provided on the outer surfaces of the electrode substrates to ensure that the polarization axis P of one polarization plate is parallel to the rubbing direction 50 and the polarization axis A of the other polarization plate is orthogonal to the rubbing direction 50 [FIG. 4(a)], and triangular wave voltage (1 Hz) is applied to the element by an external electric source to measure the voltage-transmittance properties, which is shown in FIG. 6. The driving margin was about zero (it was 0.23 in Example 1).

EXAMPLE 2

The polyimide membranes represented by the following structural formulae were used in place of PI-201, the orientation controlling membrane used in Example 1:

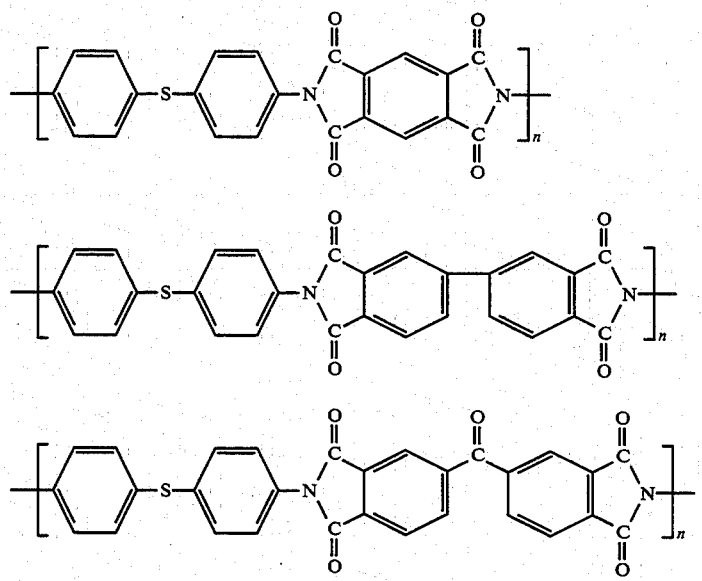

The orientation controlling membranes shown above were synthesized in the following manner.

Bis(4-aminophenyl)sulfide (3 mmole) was added to 20 ml of dry dimethylacetamide and dissolved under nitrogen atmosphere at a temperature of 10°-15° C. To the solution was added a carboxylic anhydride (pyromellitic dianhydride in the case of PIS-1, 3,3',4,4'-biphenyl-tetracarboxylic dianhydride in the case of PIS-2, and benzophenone-3,3',4,4'-tetracarboxylic dianhydride in the case of PIS-3; 3 mmole) with stirring under nitrogen atmosphere at a temperature of 10°-15° C. Stirring was continued for about 1.5 hours and further continued at room temperature for about 1.5 hours. The viscous solution was then left standing overnight at room temperature.

After the viscosity of the solution was lowered by the addition of methylacetamide, the mixture was poured into 500 ml of methanol. Yellow flakes precipitated were collected, washed sufficiently with methanol and dried under vacuum at 100° C. The viscosity of the polyamide-carboxylic acid thus synthesized (30° C., concentration of 0.5 g/dl, in dimethylacetamide) was measured in the same manner as in Example 1.

PIS-1 had an inherent viscosity ($\eta_{inh}$) of 0.68,
PIS-2 had an inherent viscosity ($\eta_{inh}$) of 0.36, and
PIS-3 had an inherent viscosity ($\eta_{inh}$) of 0.31.

An inherent viscosity ($\eta_{inh}$) for preparing film is 0.3 or more.

Figure 7:
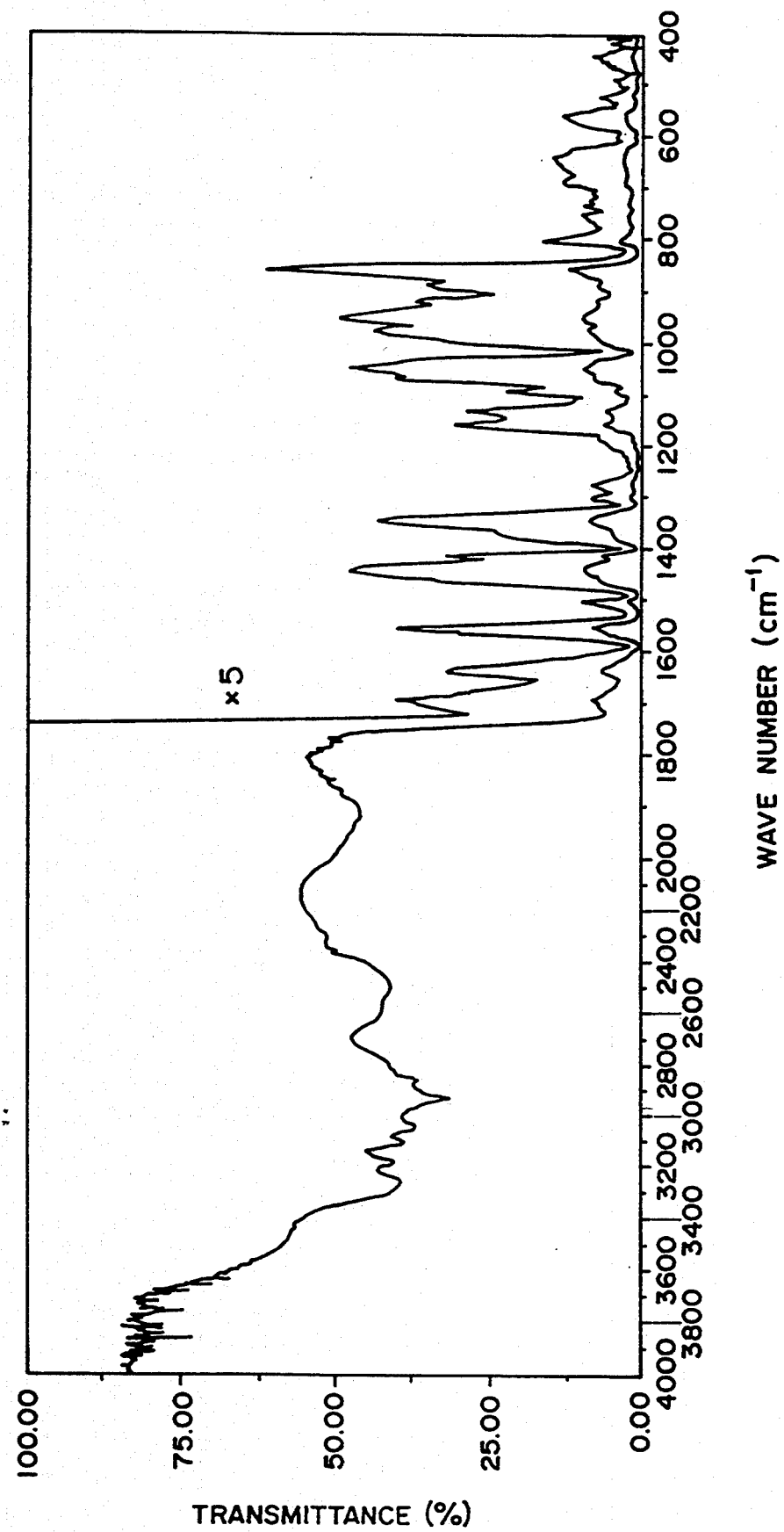
FIGS. 7-9 show the infrared spectra of the polyamide-carboxylic acid membrane PIS-1, PIS-2 and PIS-3 used in Example 2, respectively.
Figure 8:
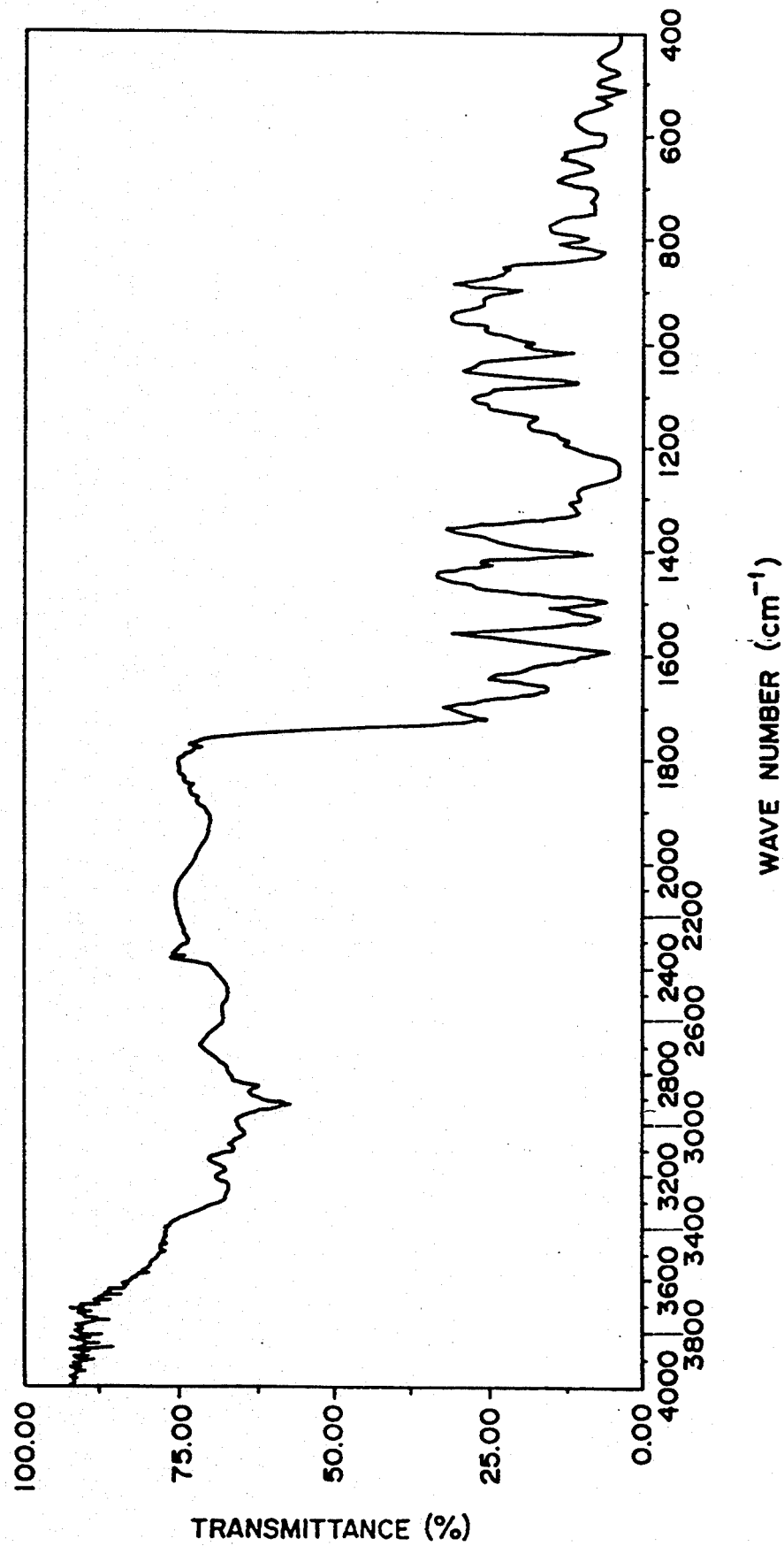
Figure 9:
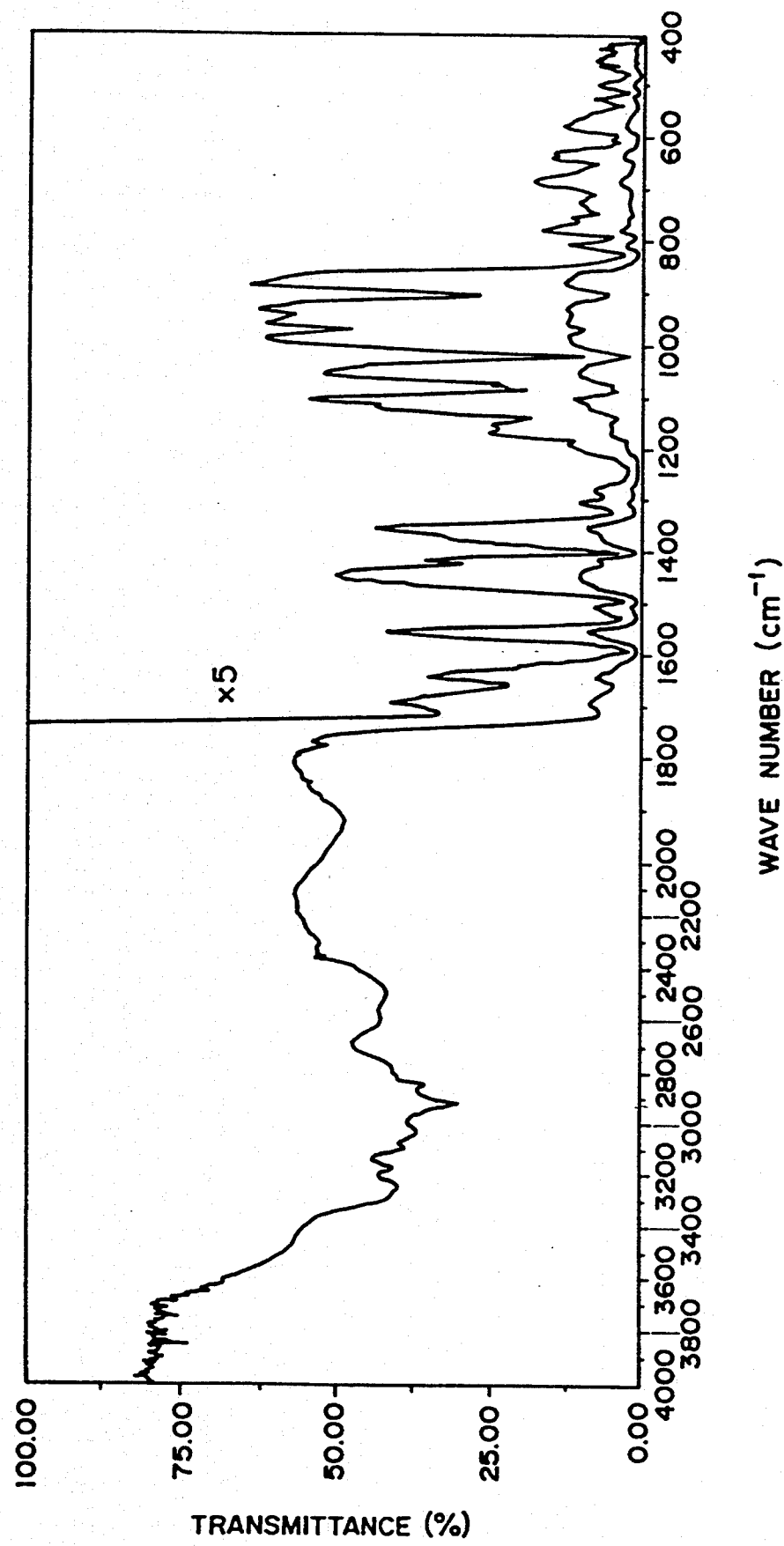

Infrared spectra were also measured in the same manner as in Example 1, and shown in FIG. 7 (PIS-1), FIG. 8 (PIS-2) and FIG. 9 (PIS-3).

The polyamide-carboxylic acids thus obtained were used as the orientation controlling membrane, spread on the substrate in the same method as in Example 1 and imitated to form the same liquid crystal element as in Example 1. Similarly, the orientation contrast and the driving margin were measured, PIS-1 had an orientation contrast in the range of 42-18, and a driving margin of 1.60,
PIS-2 had an orientation contrast in the range of 38-15, and a driving margin of 0.71, and
PIS-3 had an orientation contrast in the range of 20-15, and a driving margin of 1.22.

As described above, according to the present invention, the initial orientation of a ferroelectric liquid crystal or an antiferroelectric liquid crystal can be improved and a liquid crystal element having a uniform liquid crystal molecular arrangement over a wide range can be obtained by using the orientation controlling membrane having a particular structure with ferroelectric liquid crystal material or an antiferroelectric liquid crystal material.

Thus, an excellent electrooptical effect of the ferroelectric liquid crystal material or the antiferroelectric liquid crystal material using the present orientation control membrane can be exhibited, so that the orientation controlling membrane exhibits a significant effect by applying it to a large picture display element with high resolution, a TV picture display with wide viewing angle or a liquid crystal optical shutter.

What is claimed is:

1. A ferroelectric liquid crystal element comprising a ferroelectric liquid crystal encapsulated between a pair of transparent electrode substrates, wherein an orientation controlling membrane is formed on the surfaces of said pair of substrates and is in contact with the ferroelectric liquid crystal and said orientation controlling membrane is constituted from the polyimide membrane comprising the repeating unit represented by the formula

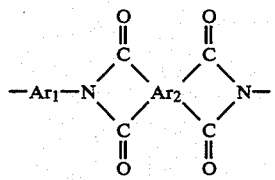 (I)

wherein $Ar_1$ represents a diamine moiety having the formula

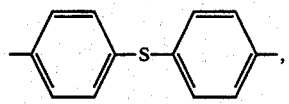, and $Ar_2$ represents the following tetravalent carboxylic acid moiety

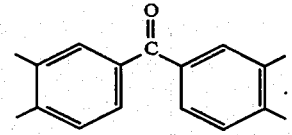

2. An antiferroelectric liquid crystal element comprising an antiferroelectric liquid crystal encapsulated between a pair of transparent electrode substrates, wherein an orientation controlling membrane is formed on the surface of said pair of substrates and is in contact with the antiferroelectric liquid crystal and said orientation controlling membrane is constituted from the polyimide membrane comprising the repeating unit represented by the formula:

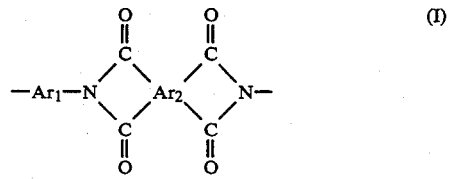 (I)

wherein $Ar_1$ represents a diamine moiety having the formula

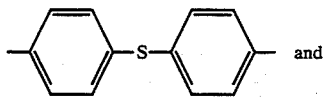 and $Ar_2$ represents the following tetravalent carboxylic acid moiety

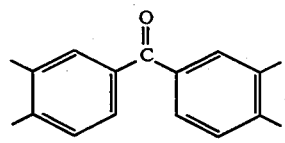.

3. The antiferroelectric liquid crystal element of claim 2 wherein said antiferroelectric liquid crystal is selected from the group consisting of: (R),(S)-(−)-4-(1-methylheptyloxycarbonyl)phenyl-4-octyloxybiphenyl-4-carboxylate, (R),(+)-4-(1-trifluoromethylheptyloxycarbonyl)phenyl-4-octyloxybiphenyl-4-carboxylate, and (R),(+)-4-(1-trifluoromethylheptyloxycarbonyl)-phenyl-4-decylbiphenyl-4-carboxylate.

* * * * *